(12) United States Patent
Dimartino et al.

(10) Patent No.: US 11,181,148 B2
(45) Date of Patent: Nov. 23, 2021

(54) COMPOSITE BEARING AND METHOD OF MAKING AND USING THE SAME

(71) Applicant: SAINT-GOBAIN PERFORMANCE PLASTICS CORPORATION, Solon, OH (US)

(72) Inventors: Vincent Dimartino, Clifton, NJ (US); Gregory Ali, Little Falls, NJ (US); Brandon S. Murphy, West Milford, NJ (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 16/823,437

(22) Filed: Mar. 19, 2020

(65) Prior Publication Data

US 2020/0300298 A1    Sep. 24, 2020

Related U.S. Application Data

(60) Provisional application No. 62/822,340, filed on Mar. 22, 2019.

(51) Int. Cl.
*F16C 25/02*        (2006.01)
*F16C 33/30*        (2006.01)
(Continued)

(52) U.S. Cl.
CPC ............ *F16C 33/303* (2013.01); *F16C 25/02* (2013.01); *F16C 33/6637* (2013.01);
(Continued)

(58) Field of Classification Search
CPC ................... F16C 25/02; F16C 27/045; F16C 33/124–125; F16C 33/201; F16C 33/206;
(Continued)

(56) References Cited

U.S. PATENT DOCUMENTS 1,816,474 A      7/1931  Eaton
3,909,087 A *    9/1975  Cairns ................. F16C 33/1075
                                                      384/293

(Continued)

FOREIGN PATENT DOCUMENTS

DE      10062876 C1 *   4/2002   ................ F16C 9/04
EP       0143449 A2 *   6/1985   ............ F16C 33/121
(Continued)

OTHER PUBLICATIONS

Kopeliovich, Geometry and dimensional tolerances of engine bearings, King Engine Bearings, Inc., 8 pages.

(Continued)

*Primary Examiner* — Marcus Charles
(74) *Attorney, Agent, or Firm* — Abel Schillinger, LLP; Chi Suk Kim

(57) ABSTRACT

An assembly including an inner member; an outer member; and a bearing including a bearing sidewall including a flat portion, a first convex axial end, and a second convex axial end, where at least one of the inner member or the outer member is adapted to axially translate relative to the bearing, and where at least one of the first convex axial end or the second convex axial end is adapted to induce formation of a film on the bearing sidewall during the axial translation of at least one of the inner member or the outer member.

20 Claims, 5 Drawing Sheets

(51) Int. Cl.
*F16C 33/34* (2006.01)
*F16C 33/66* (2006.01)
*F16C 33/76* (2006.01)

(52) U.S. Cl.
CPC ............ *F16C 33/761* (2013.01); *F16C 33/34* (2013.01); *F16C 2204/72* (2013.01); *F16C 2240/40* (2013.01)

(58) Field of Classification Search
CPC ...... F16C 33/208; F16C 33/303; F16C 33/34; F16C 33/6637; F16C 33/761; F16C 2204/72; F16C 2208/58; F16C 2240/40; F16C 2240/60; F16C 2325/05; F16C 2326/05
USPC .... 384/192, 276, 297, 445, 907.1, 908, 913; 29/898.043; 428/548
See application file for complete search history.

(56) References Cited

U.S. PATENT DOCUMENTS

| | | | |
|---|---|---|---|
| 4,239,301 A | 12/1980 | Pannwitz | |
| 4,869,601 A | 9/1989 | Scott | |
| 4,995,735 A * | 2/1991 | Dansdill | F16C 33/10 384/276 |
| 6,802,648 B2 * | 10/2004 | Merot | F16C 27/063 384/215 |
| 7,175,500 B1 | 2/2007 | Difeo | |
| 8,545,102 B2 * | 10/2013 | Hayashi | F16C 33/14 384/192 |
| 9,168,726 B2 * | 10/2015 | Ponnouradjou | F16C 33/28 |
| 9,982,715 B2 * | 5/2018 | Gorges | F16C 33/1045 |
| 10,047,792 B2 * | 8/2018 | Guettler | F16C 23/041 |
| 2003/0012467 A1 | 1/2003 | Merot et al. | |
| 2003/0156769 A1 | 8/2003 | Whang | |
| 2007/0041672 A1 | 2/2007 | Maruyama et al. | |
| 2007/0092173 A1 * | 4/2007 | Tsuji | F16C 33/046 384/276 |
| 2009/0110338 A1 | 4/2009 | Blase et al. | |
| 2010/0124388 A1 * | 5/2010 | Long | F16C 33/208 384/126 |
| 2011/0049834 A1 | 3/2011 | Natu | |
| 2011/0164840 A1 | 7/2011 | Hayashi et al. | |
| 2011/0262064 A1 * | 10/2011 | Burgeff | F16C 17/10 384/220 |
| 2012/0106882 A1 * | 5/2012 | Ponnouradjou | F16C 17/02 384/297 |
| 2014/0093332 A1 | 4/2014 | Hagan et al. | |
| 2015/0308498 A1 * | 10/2015 | Fisher | F16C 33/74 384/299 |
| 2016/0069112 A1 | 3/2016 | Neumark et al. | |
| 2017/0081522 A1 * | 3/2017 | Adam | C09D 7/61 |
| 2017/0247631 A1 * | 8/2017 | Kim | F16C 33/20 |
| 2018/0306238 A1 | 10/2018 | Mason et al. | |

FOREIGN PATENT DOCUMENTS

| | | | |
|---|---|---|---|
| EP | 0558282 B1 * | 11/1998 | ............ F16C 33/201 |
| EP | 2957781 A2 | 12/2015 | |
| GB | 919223 A * | 2/1963 | ............ B29C 43/00 |
| GB | 1326193 A * | 8/1973 | ............ F16C 33/04 |
| GB | 2501926 A * | 11/2013 | ............ F16C 33/208 |
| GB | 2507768 A * | 5/2014 | ............ F16C 33/20 |
| GB | 2513867 A * | 11/2014 | ......... F16C 33/1045 |
| JP | H04307112 A | 10/1992 | |
| JP | 2685333 B2 | 12/1997 | |
| JP | H11230160 A | 8/1999 | |
| RU | 2397113 C2 * | 8/2010 | ............ B64C 27/605 |
| WO | WO-2007111810 A1 * | 10/2007 | ............ F16D 3/385 |
| WO | 2009060028 A1 | 5/2009 | |
| WO | 2020197908 A1 | 10/2020 | |

OTHER PUBLICATIONS

International Search Report and Written Opinion for PCT/US2020/023489, dated Jul. 13, 2020, 13 pages.

* cited by examiner

COMPOSITE BEARING AND METHOD OF MAKING AND USING THE SAME

CROSS-REFERENCE TO RELATED APPLICATION(S)

This application claims priority under 35 U.S.C. § 119(e) to U.S. Patent Application No. 62/822,340 entitled "COMPOSITE BEARING AND METHOD OF MAKING AND USING THE SAME," by Vincent DIMARTINO et al., filed Mar. 22, 2019, which is assigned to the current assignee hereof and incorporated herein by reference in its entirety.

FIELD OF THE DISCLOSURE

This disclosure relates to bearing assemblies and methods of making and using the same. By non-limiting example, the assembly can be used in a bearing for a suspension assembly for a vehicle.

BACKGROUND

Bearings made of composite materials including a substrate and a low friction layer overlay are generally known. Such bearings can be used, for example, in a suspension assembly. A suspension assembly may be used to connect a vehicle component relative to another vehicle component and provide cushioning or damping to control movement of the components. The suspension assembly can be used in vehicles such as bicycles, motorcycles, ATVs, cars, trucks, SUVs, aircraft, watercraft, or in other vehicles. Typically, a suspension system may allow one component to move past another component, such as between inner component (such as a shaft), to an outer component (such as housing) with a bearing between the two components. However, current bearing designs may contribute to undesirable characteristics, such as vibration, stick-slip, and friction within components of the vehicle suspension, which may lead to undesirable suspension characteristics such as suspension sag, improper bump absorption, or misalignment within components of the suspension assembly. Therefore, there exists a need for improved bearings particularly suited for suspension assemblies.

BRIEF DESCRIPTION OF THE DRAWINGS

The present disclosure may be better understood, and its numerous features and advantages made apparent to those skilled in the art by referencing the accompanying drawings.

Figure 1:
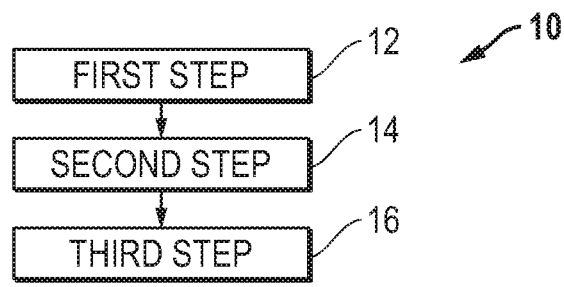
FIG. 1 includes a method of producing a bearing in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and bearing assembly arts.

Embodiments described herein are generally directed to a bearing and methods of creating and using a bearing within an assembly. In particular embodiments, the bearing may have a bearing sidewall defining an axial length, L, of the bearing, where the sidewall includes a flat portion, a first convex axial end, and a second convex axial end.

For purposes of illustration, FIG. 1 includes a diagram showing a forming process 10 for forming a bearing. The forming process 10 may include a first step 12 of providing a base material, a second step 14 of coating the base material with a low friction coating to form a composite material and a third step 16 of forming the composite material into a bearing.

Referring to the first step 12, the base material may be a substrate. In an embodiment, the substrate can at least partially include a metal. According to certain embodiments, the metal may include iron, copper, titanium, tin, aluminum, alloys thereof, or may be another type of metal. More particularly, the substrate can at least partially include a steel, such as, a stainless steel, carbon steel, or spring steel. For example, the substrate can at least partially include a 301 stainless steel. The 301 stainless steel may be annealed, ¼ hard, ½ hard, ¾ hard, or full hard. In an embodiment, the substrate may include a woven mesh or an expanded metal grid.

Figure 2A:
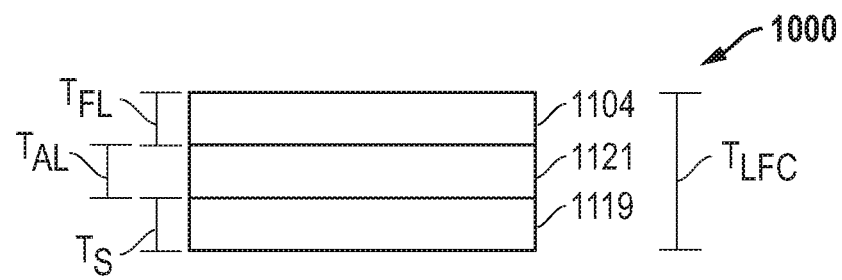
FIG. 2A includes an illustration of a cross-sectional view of a bearing in accordance with an embodiment.

FIG. 2A includes an illustration of the composite material 1000 that may be formed according to first step 12 and second step 14 of the forming process 10. For purposes of illustration, FIG. 2A shows the layer by layer configuration of a composite material 1000 after second step 14. In a number of embodiments, the composite material 1000 may include a substrate 1119 (i.e., the base material noted above and provided in the first step 12) and a low friction layer 1104 (i.e., the low friction coating applied in second step 14). The low friction layer 1104 can be coupled to at least a portion of the substrate 1119. In a particular embodiment, the low friction layer 1104 can be coupled to a surface of the substrate 1119 so as to form a low friction interface with another component. In the case of an annular component, such as a generally cylindrical component, the low friction layer 1104 can be coupled to the radially inner or outer surface of the substrate 1119 so as to form a low friction interface with another component. The substrate 1119 can have a thickness, $T_s$, of between about 1 micron to about 3000 microns, such as between about 50 microns and about 1500 microns, such as between about 100 microns and about 1000 microns, such as between about 200 microns and about 800 microns. In a number of embodiments, the substrate 1119 may have a thickness, $T_s$, of between about 100 and 800 microns. In a number of embodiments, the substrate 1119 may have a thickness, $T_s$, of between about 200 and 550 microns. It will be further appreciated that the thickness, $T_s$, of the substrate 1119 may be any value between any of the minimum and maximum values noted above. The thickness of the substrate 1119 may be uniform, i.e., a thickness at a first location of the substrate 1119 can be equal to a thickness at a second location therealong. The thickness of the substrate 1119 may be non-uniform, i.e., a thickness at a first location of the substrate 1119 can be different than a thickness at a second location therealong. In a number of embodiments, the substrate 1119 may extend at least partially along a length of the composite material 1000.

In a number of embodiments, the low friction layer 1104 can include a low friction material. Low friction materials may include, for example, a polymer, such as a polyketone, a polyaramid, a polyimide, a polyetherimide, a polyphenylene sulfide, a polyethersulfone, a polysulfone, a polyphenylene sulfone, a polyamideimide, ultra high molecular weight polyethylene, a fluoropolymer, a polyamide, a polybenzimidazole, a polyacetal, polybutylene terephthalate, polyethylene terephthalate, polyethylene, polyphenylene oxide, polyurethane, polyester, liquid crystal polymer (LCP), a derivation thereof, or a combination thereof. In a particular example, the low friction layer 1104 may include polyketone, such as polyether ether ketone (PEEK), polyether ketone, polyether ketone ketone, polyether ketone ether ketone, a derivative thereof, or a combination thereof. In an additional example, the low friction layer 1104 may be include a fluoropolymer, such as fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The low friction layer 1104 may further include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof.

In a number of embodiments, the low friction layer 1104 may further include fillers, including glass fibers, carbon fibers, silicon, PEEK, aromatic polyester, carbon particles, bronze, fluoropolymers, thermoplastic fillers, aluminum oxide, polyamideimide (PAI), PPS, polyphenylene sulfone (PPSO2), LCP, aromatic polyesters, molybdenum disulfide, tungsten disulfide, graphite, graphene, expanded graphite, boron nitride, talc, calcium fluoride, $BaSO_4$, iron oxide, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In an embodiment, the low friction layer 1104 can have a thickness, $T_{FL}$, of between about 1 micron to about 500 microns, such as between about 10 microns and about 450 microns, such as between about 50 microns and about 350 microns, such as between about 100 microns and about 300 microns. In a number of embodiments, the low friction layer 1104 may have a thickness, $T_{FL}$, of between about 50 and 330 microns. It will be further appreciated that the thickness, $T_{FL}$, of the low friction layer 1104 may be any value between any of the minimum and maximum values noted above. The thickness of the low friction 1104 may be uniform, i.e., a thickness at a first location of the low friction layer 1104 can be equal to a thickness at a second location therealong. The thickness of the low friction 1104 may be non-uniform, i.e., a thickness at a first location of the low friction layer 1104 can be different than a thickness at a second location therealong. The low friction layer 1104 may overlie one major surface of the substrate 1119, shown, or overlie both major surfaces. The substrate 1119 may be at least partially encapsulated by the low friction layer 1104. That is, the low friction layer 1104 may cover at least a portion of the substrate 1119. Axial surfaces of the substrate 1119 may or may not be exposed from the low friction layer 1104.

In an embodiment, the composite material 1001 may also include at least one adhesive layer 1121 that may couple the low friction layer 1104 to the substrate 1119 (i.e., the base material provided in the first step 12) and a low friction layer 1104 (i.e., the low friction coating applied in second step 14). In another alternate embodiment, the substrate 1119, as a solid component, woven mesh or expanded metal grid, may be embedded between at least one adhesive layer 1121 included between the low friction layer 1104 and the substrate 1119.

The adhesive layer 1121 may include any known adhesive material common to the bearing arts including, but not limited to, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 450° C., such as not greater than 320° C. In another embodiment, the adhesive may break down above 300° C., such as above 220° C. In further embodiments, the melting temperature of the hot melt adhesive can be higher than 250° C. or even higher than 300° C. The adhesive layer 1121 can have a thickness, $T_{AL}$, of between about 1 micron to about 100 microns, such as between about 10 microns and about 50 microns. In a number of embodiments, the adhesive layer 1121 may have a thickness, $T_{AL}$, of between about 20 and 50 microns. It will be further appreciated that the thickness, $T_{AL}$, of the adhesive layer 1121 may be any value between any of the minimum and maximum values noted above. The thickness of the adhesive layer 1121 may be uniform, i.e., a thickness at a first location of the adhesive layer 1121 can be equal to a thickness at a second location therealong. The thickness of the adhesive layer 1121 may be non-uniform, i.e., a thickness at a first location of the adhesive layer 1121 can be different than a thickness at a second location therealong.

Figure 2B:
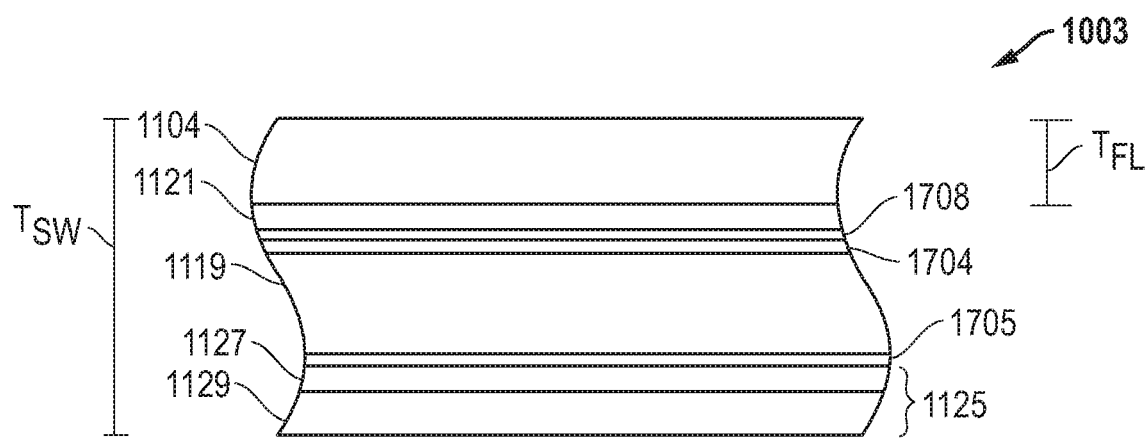
FIG. 2B includes an illustration of a cross-sectional view of a bearing in accordance with an embodiment.

FIG. 2B includes an illustration of another embodiment. According to this particular embodiment, the composite material 1003 may be similar to the composite material 1000 of FIG. 2A, except this composite material 1003 may also include corrosion protection layers 1704, 1705, and 1708, and a corrosion resistant layer 1125 that can include an adhesion promoter layer 1127 and an epoxy layer 1129 that may couple to the substrate 1119 (i.e., the base material provided in the first step 12) and a low friction layer 1104 (i.e., the low friction coating applied in second step 14).

The substrate 1119 may be coated with corrosion protection layers 1704 and 1705 to prevent corrosion of the substrate 1119 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

As stated above, the composite material 1003 may further include a corrosion resistant layer 1125. The corrosion resistant layer 1125 can have a thickness of about 1 to 50 microns, such as about 5 to 20 microns, and such as about 7 to 15 microns. The corrosion resistant layer 1125 can include an adhesion promoter layer 1127 and an epoxy layer 1129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy layer 1129 can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetramine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above. In an embodiment, the epoxy layer 1129 can include fillers to improve the conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the coated bearing as compared to a coated bearing without conductive fillers.

In an embodiment, the composite material 1000, 1003 can have a thickness, $T_{SW}$, in a range of 0.01 mm and 4 mm, such as in a range of 0.15 mm and 2.5 mm, or even in a range of 0.2 mm and 1 mm. It will be further appreciated that the thickness, $T_{SW}$ of the composite material 1000, 1003 may be any value between any of the minimum and maximum values noted above. The thickness, $T_{SW}$ of the composite material 1000, 1003 may be uniform, i.e., a thickness at a first location of the composite material 1000, 1003 can be equal to a thickness at a second location therealong. The thickness, $T_{SW}$ of the composite material 1000, 1003 may be non-uniform, i.e., a thickness at a first location of the composite material 1000, 1003 can be different than a thickness at a second location therealong.

In an embodiment, under step 14 of FIG. 1, any of the layers on the composite material 1000, 1003 as described above, can each be disposed in a roll and peeled therefrom to join together. Joining may be done under pressure, optionally at elevated temperatures (e.g., hot pressed), and with an adhesive. Any of the layers of the composite material 1000, as described above, may be laminated together such that they at least partially overlap one another.

Figure 3:
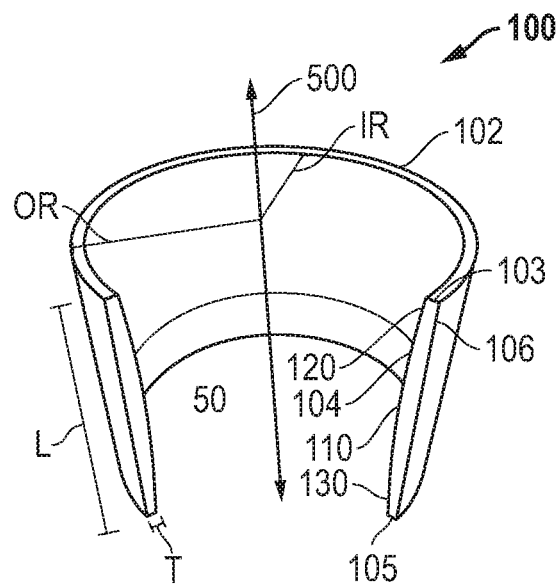
FIG. 3 includes an illustration of a bearing according to a number of embodiments.

FIG. 3 shows a cut-away view illustrating an embodiment of a finished bearing, using the materials and methods of formation as described above, generally designated 100. In a number of specific embodiments, the bearing 100 may be a plain bearing. In a number of embodiments, the bearing 100 may be a sliding bearing. The bearing 100 may extend in the axial direction relative to a central axis 500. The central axis 500 is oriented longitudinally extending along the length of the bearing 100. Bearing 100 can include a bearing sidewall 102 forming an annular shape. The bearing 100 may include a first axial end or edge 103 and a second axial end or edge 105. The bearing may have an inner radial end 104 and an outer radial end or edge 106. The bearing sidewall may include (as viewed in longitudinal cross-section) a flat portion 110, a first convex axial end 120, and a second convex axial end 130 between the first axial end or edge 103 and the second axial end or edge 105. The first convex axial end 120 and the second convex axial end 130 of the bearing 100 may meet at the flat portion 110 of the bearing 100. Flat portion 100, as used herein, is in the context of an axial cross-section taken parallel to the central axis 500. Three-dimensionally, the flat portion 110 forms a cylindrical shape. The flat portion 110 of the bearing 100 may be substantially parallel to the central axis 500.

Figure 4:
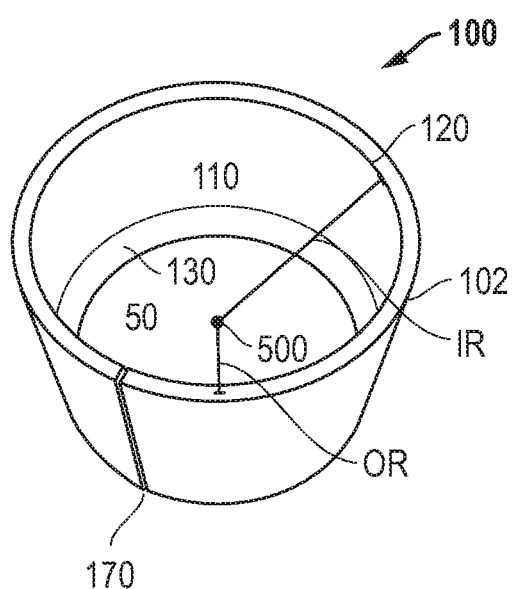
FIG. 4 includes an illustration of a bearing according to a number of embodiments.

FIG. 4 shows a top view of an embodiment of a bearing 100. As shown in FIG. 4, the opposite ends of the bearing 100 may meet at an axial gap 170 that extends in the axial direction along the bearing sidewall 102. An axial gap 170 extending nonlinearly and/or obliquely to the central axis 500 of the bearing 100 is also possible. In a number of particular embodiments, the axial gap 170 may be welded or otherwise coupled by other means to form the bearing 100. In some embodiments, the axial gap 170 may be left uncoupled to ease assembly of the bearing 100.

Referring to FIGS. 3-4, the bearing 100 may include a bore 50. The bore 50 may extend down the axial length of the bearing 100 and be adapted to house an internal component of an assembly. The bore 50 may be parallel to the central axis 500. The bore 50 may be formed by bending a planar composite material 1000, 1003 into a generally cylindrical shape. Geometrical formations may be formed into the bearing sidewall 102 by various means. Optionally, the bearing 100 may include a radial flange (not shown).

In a number of embodiments, as shown in FIG. 3, the bearing 100 can have a thickness, T, and T can be in a range of 0.01 mm and 3.5 mm, such as in a range of 0.15 mm and 2.5 mm, or even in a range of 0.2 mm and 1 mm. It will be appreciated that the bearing 100 can have a thickness, T, which may be within a range between any of the minimum and maximum values noted above. The thickness, T, of the bearing may be the same as the thickness, $T_{SW}$, of the composite material 1000, 1001, 1002. The bearing 100 thickness, T may be uniform, i.e., a thickness at a first location can be equal to a thickness at a second location therealong. The bearing 100 thickness, T may be non-uniform, i.e., a thickness at a first location can be different than a thickness at a second location therealong. The bearing 100 thickness, T may be substantially the same as the thickness, $T_{SW}$ of the composite material 1000, 1003.

In a number of embodiments, as shown in FIG. 3, the bearing 100 can have an overall length, L, from the first axial end or edge 103 to the second axial end or edge 105, and L can be in a range of 5 mm and 100 mm, such as in a range of 10 mm and 50 mm, or even in a range of 15 mm and 30 mm. In a number of embodiments, the bearing 100 can have an overall length, L, of between about 5 to 100 mm. It will be further appreciated that the bearing 100 can have an overall length, L, which may be any value between any of the minimum and maximum values noted above. The bearing sidewall 102 may define the overall length, L, of the bearing 100.

In a number of embodiments, as shown in FIGS. 3-4, the bearing 100 may have an overall outer radius, OR, from the central axis 500 to the outer radial end or edge 106, and OR can be in a range of 1.5 mm and 100 mm, such as in a range of 3 mm and 50 mm, or even in a range of 4 mm and 20 mm. The overall outer radius, OR, may vary along the circumference of the bearing 100. In a number of embodiments, the bearing 100 can have an overall outer radius, OR, of between about 1.5 to 50 mm. It will be appreciated that the bearing 100 can have an overall outer radius, OR, that may be any value between any of the minimum and maximum values noted above.

In a number of embodiments, as shown in FIGS. 3-4, the bearing 100 may have an overall inner radius, IR, from the central axis 500 to the inner radial end or edge 104, and IR can be in a range of 1 mm and 100 mm, such as in a range of 2, 5 mm and 50 mm, or even in a range of 3, 5 mm and 20 mm. The inner radius IR may vary along the circumference of the bearing 100. In a number of embodiments, the bearing 100 can have an overall inner radius, IR, of between about 1 to 50 mm. It will be appreciated that the bearing 100 can have an overall inner radius, IR, which may be any value between any of the minimum and maximum values noted above.

Figure 5A:
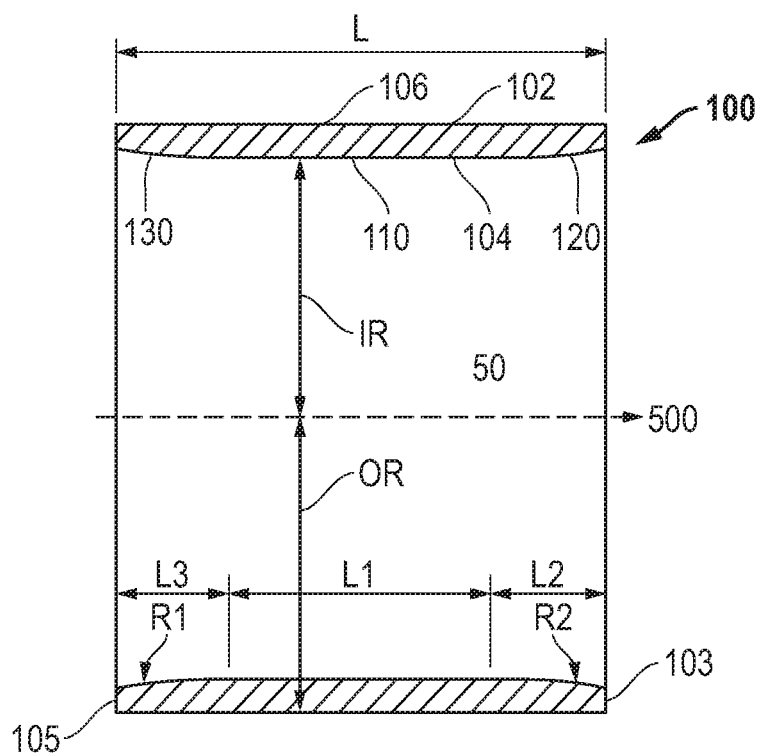
FIG. 5A includes an illustration of a cross-sectional view of a bearing according to a number of embodiments.
Figure 5B:
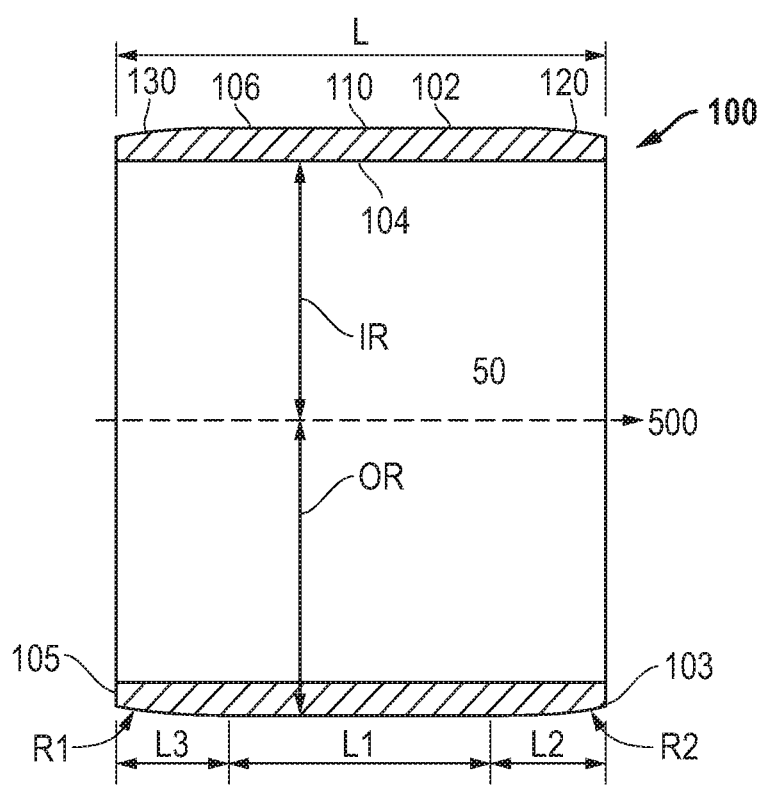
FIG. 5B is an illustration of a cross-sectional view of a bearing according to a number of embodiments.

FIGS. 5A and 5B illustrate a cross-sectional view illustrating a finished bearing 100 according to a number of different embodiments. FIG. 5A illustrates a bearing 100 where the first convex axial end 120 and the second convex axial end 130 of the bearing sidewall 102 or bearing 100 are convex inward toward the inner member 28.

Alternatively, FIG. 5B illustrates a bearing 100 where the first convex axial end 120 and the second convex axial end 130 of the bearing sidewall 102 or bearing 100 are convex outward toward the outer member 30. As shown, the first convex axial end 120 may have a first convex axial end surface R1. The first convex axial end surface R1 may be convex axially outward or inward. Further, the second convex axial end 130 may have a first convex axial end surface R2. The second convex axial end surface R2 may be convex axially either outward or inward.

In an embodiment, as shown in FIGS. 5A-5B, the flat portion 110 may include a length, L1, where L1 at least 2.5% of the axial length, L, of the bearing 100, such as at least 5% of the axial length, L, such as at least 7.5% of the axial length, L, such as at least 10% of the axial length, L, such as at least 15% of the axial length, L, such as at least 20% of the axial length, L, such as at least 25% of the axial length, L, such as at least 30% of the axial length, L, such as at least 40% of the axial length, L, such as at least 50% of the axial length, L, such as at least 60% of the axial length, L, such as at least 70% of the axial length, L, such as at least 80% of the axial length, L, such as at least 90% of the axial length, L, or such as at least 95% of the axial length, L.

In an embodiment, as shown in FIGS. 5A-5B, the first convex axial end 120 may include a length, L2, where L2 is at least 2.5% of the axial length, L, of the bearing 100, such as at least 5% of the axial length, L, such as at least 7.5% of the axial length, L, such as at least 10% of the axial length, L, such as at least 15% of the axial length, L, such as at least 20% of the axial length, L, such as at least 25% of the axial length, L, such as at least 30% of the axial length, L, such as at least 40% of the axial length, L, or such as at least 50% of the axial length, L.

In an embodiment, as shown in FIGS. 5A-5B, the second convex axial end 130 may include a length, L3, where L3 is at least 2.5% of the axial length, L, of the bearing 100, such as at least 5% of the axial length, L, such as at least 7.5% of the axial length, L, such as at least 10% of the axial length, L, such as at least 15% of the axial length, L, such as at least 20% of the axial length, L, such as at least 25% of the axial length, L, such as at least 30% of the axial length, L, such as at least 40% of the axial length, L, or such as at least 50% of the axial length, L.

Figure 6:
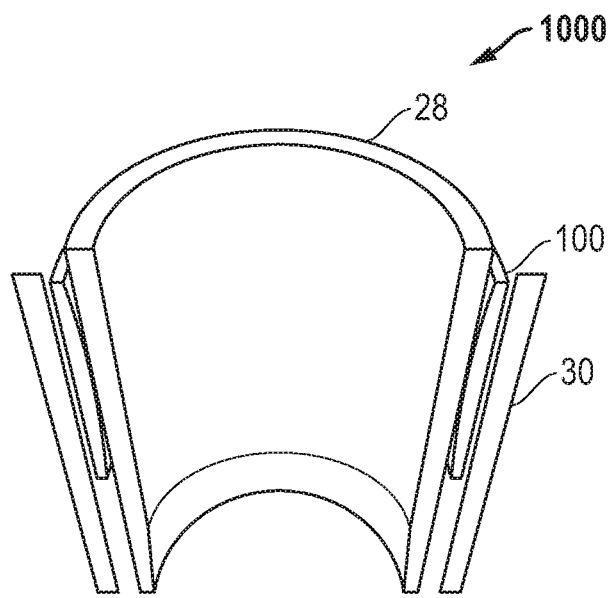
FIG. 6 includes an illustration of a bearing within an assembly according to a number of embodiments.

FIG. 6 shows a side view illustrating a finished bearing 100 within an assembly 1000 according to a number of embodiments. The assembly 1000 may further include an inner member 28 and an outer member 30. At least one of the inner member or the outer member 30 may include a shaft, rod, or tube. The outer member 30 may include a housing within an assembly. As shown in FIG. 6, the bearing 100 is disposed between the inner member 28 and the outer member 30.

In an embodiment, the inner member 28 can include any material commonly used in the sliding assembly arts. The inner component 28 can include any suitable material with sufficient rigidity to withstand axial and longitudinal forces. In a particular embodiment, the inner member 28 can include a polymer. In another embodiment, the inner member 28 can include a metal or alloy (such as, but not limited to, aluminum, zinc, copper, magnesium, tin, titanium, tungsten, iron, bronze, steel, spring steel, stainless steel). The inner member 28 can be formed from a single piece, two pieces, or several pieces joined together by welding, adhesive, fasteners, threading, or any other suitable fastening means.

In an embodiment, the outer member 30 can include any material commonly used in the sliding assembly arts. The outer member 30 can include any suitable material with sufficient rigidity to withstand axial and longitudinal forces. In a particular embodiment, the outer member 30 can include a polymer. In another embodiment, the outer member 30 can include a metal or alloy (such as, but not limited to, aluminum, zinc, copper, magnesium, tin, titanium, tungsten, iron, bronze, steel, spring steel, stainless steel). The outer member 30 can be formed from a single piece, two pieces, or several pieces joined together by welding, adhesive, fasteners, threading, or any other suitable fastening means.

In an embodiment, the bearing 100 may translate in unison with at least one of the inner member 28 and the outer member 30. For example, the bearing 100 may be positionally fixed to the outer member 30, and the inner member 28 may translate longitudinally relative to the outer member 30 and the bearing 100. Alternatively, the bearing 100 may be positionally fixed to the inner member 28, and the outer member 30 may translate longitudinally relative to the inner member 28 and the bearing 100.

In an embodiment, at least one of the inner member 28 or the outer member 30 may be adapted to axially translate relative to the bearing 100 at least 2.5% of the axial length, L, of the bearing 100, such as at least 5% of the axial length, L, such as at least 7.5% of the axial length, L, such as at least 10% of the axial length, L, such as at least 15% of the axial length, L, such as at least 20% of the axial length, L, such as at least 25% of the axial length, L, such as at least 30% of the axial length, L, such as at least 40% of the axial length, L, such as at least 50% of the axial length, L, such as at least 60% of the axial length, L, such as at least 70% of the axial length, L, such as at least 80% of the axial length, L, such as at least 90% of the axial length, L, or such as at least 100% of the axial length, L. In a number of embodiments, at least one of the inner member 28 or the outer member 30 may be adapted to axially translate relative to the bearing 100 at least 0.01 mm, such as at least 0.05 mm, at least 0.1 mm, at least 0.15 mm, at least 0.2 mm, at least 0.25 mm, at least 0.3 mm, at least 0.5 mm, or at least 1 mm. In a number of embodiments, at least one of the inner member 28 or the outer member 30 may be adapted to axially translate relative to the bearing 100 no greater than 500 mm, such as no greater than 400 mm, no greater than 300 mm, no greater than 200 mm, no greater than 150 mm, no greater than 100 mm, no greater than 50 mm, no greater than 25 mm, or no greater than 10 mm.

Figure 7:
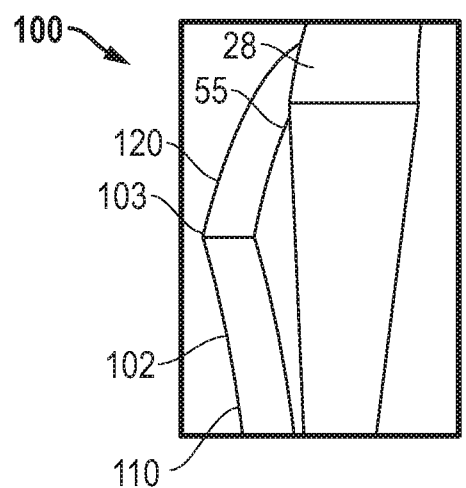
FIG. 7 includes an illustration of a bearing within an assembly according to a number of embodiments.

FIG. 7 shows a close up view illustrating the first convex axial end 120 of a finished bearing 100 within an assembly 1000 according to a number of embodiments. In a number of embodiments, at least one of the first convex axial end 120 or the second convex axial end 130 of the bearing 100 may be continuously convex. As used herein "continuously convex" may be defined as continuously increasing in slope asymptotically tangent from either the first axial end 103 or the second axial end 105 of the bearing 100 toward the flat portion 110 respectively. At least one of the first convex axial end 120 or the second convex axial end 130 of the bearing 100 may have a radius of curvature of at least 0.05 mm, such as at least 0.1 mm, at least 0.15 mm, at least 0.25 mm, at least 0.5 mm, at least 1 mm, at least 5 mm, at least 15 mm, at least 25 mm, at least 50 mm, at least 100 mm, at least 250 mm, at least 500 mm, or at least 100 mm. In a number of embodiments, at least one of the first convex axial end 120 or the second convex axial end 130 of the bearing sidewall 102 or bearing 100 may be formed by at least one of chamfering, turning, reaming, forging, extruding, molding, sintering, rolling, or casting.

In at least one embodiment, the assembly 1000 may include a film 55 in the form of lubricant on any of its components. In at least one embodiment, the lubricant may include a grease including at least one of lithium soap, lithium disulfide, graphite, mineral or vegetable oil, silicone grease, fluorether-based grease, apiezon, food-grade grease, petrochemical grease, or may be a different type. In at least one embodiment, the lubricant may include an oil including at least one of a Group I-Group III+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based oil, or may be a different type. In at least one embodiment, the lubricant may include a solid based lubricant including at least one of lithium soap, graphite, boron nitride, molybdenum disulfide, tungsten disulfide, polytetrafluoroethylene, a metal, a metal alloy, or may be a different type.

In a number of embodiments, the axial translation of at least one of the inner member 28 or the outer member 30 relative to the bearing 100 may induce formation of a film 55 on the bearing sidewall 102 during the axial translation of at least one of the inner member 28 or the outer member 30. This may result from at least one of the first convex axial end 120 or the second convex axial end 130 of the bearing 100 inducing the formation of the film 55. In a number of embodiments at least one of the first convex axial end 120 or the second convex axial end 130 of the bearing 100 may induce the formation of the film 55 on the flat portion 110 of the bearing sidewall 102 of the bearing 100. The induction of fluid film 55 may take place during axial translation of at least one of the inner member 28 or the outer member 30 during movement between the components. The induction of fluid film 55 may take place during axial translation of at least one of the inner member 28 or the outer member 30 during oscillatory or cyclic movement between the components. The induction of fluid film 55 may take place as the lubricant may be pulled inwards from axially proximate components in the assembly 1000 into proximity with at least one of the convex axial end 120 and the second convex axial end 130 of the bearing 100 during axial translation of at least one of the inner member 28 or the outer member 30, where the film 55 propagates in the flat portion 110 of the bearing. As the inner or outer member 28, 30 translates relative to the bearing 100, lubricant 55 may be drawn into the flat portion 110 of the bearing 100 along either the first convex axial end 120 or the second convex axial end 130. Referring back to FIGS. 5A-5B, a viscous wedge may form proximal to the point at which the flat portion 110 meets either the first convex axial end 120 or the second convex axial end 130. The viscous wedge allows for fluid film 55 to develop between the bearing surface R1, R2 and translating inner component 28 or outer component 30. Either the first convex axial end 120 or second axial end 130 may be tangent to the flat portion 110 at the point at which the flat portion 110 meets either the first convex axial end 120 or the second convex axial end 130.

Figure 8:
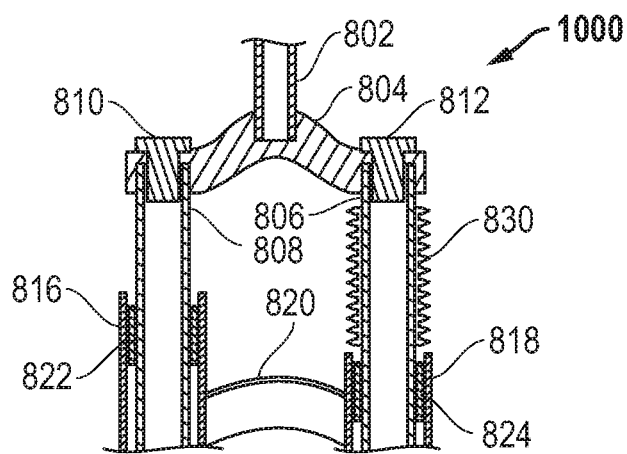
FIG. 8 includes an illustration of a bearing within an assembly according to a number of embodiments.

FIG. 8 illustrates an assembly 1000 in the form of a suspension assembly for a vehicle. In this non-limiting embodiment, the assembly 1000 is an exemplary front fork shock absorber suspension assembly for a two-wheeled vehicle, such as a motorcycle or bicycle. In the assembly 1000, a steerer 802 may be paired with a crown 804 that can house two inner stanchions 806, 808 (or inner member 28 as described herein). The inner stanchions 806, 808 may pair with the crown 804 via a pair of top caps 810, 812. Two sliders 816, 818 (or outer member(s) 30 as described herein) can be placed over the inner stanchions 806, 808. The sliders 816, 818 may be connected by an arch 820. Bearings 822, 824 can be placed between the inner stanchions 806, 808 and the sliders 816, 818 to maintain alignment and prevent contact between the inner stanchions 806, 808 and the sliders 816, 818. Bearings 822 and 824 can be substantially the same as bearings 100, as previously described. Optionally, a boot 830 may be placed over one of the inner stanchions 806, 808 to prevent contamination of the sliding surface of the bearing 100 by dirt and other particulate matter, and/or aid in providing a damping effect. Alternatively, the bearing 100 may be used in an assembly 1000 for another suspension component.

Figure 9:
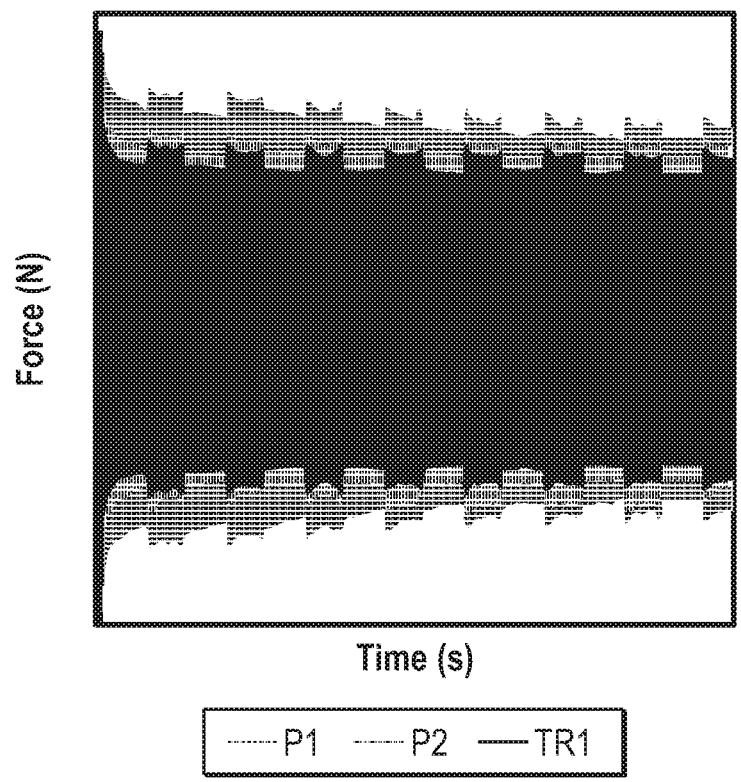
FIG. 9 includes an illustration of a graph of time versus the dynamic friction force in the axial direction of a bearing in comparison to existing prior art bearings according to a number of embodiments.

FIG. 9 illustrates a graph of time versus the dynamic friction force in the axial direction of a bearing in comparison to existing prior art bearings according to a number of embodiments. Bearing P1 is a known prior art bearing. Bearing P2 is a known prior art bearing. Bearing TR1 is a bearing 100 according to embodiments shown herein. As shown, embodiments of bearings 100 shown herein have improved (reduced) dynamic friction performance when compared to bearings known in the art due to the convex axial end of the bearings 100.

Various embodiments disclosed here can have significant advantages over conventional solutions. According to embodiments herein, bearings with improved dynamic friction performance and stick-slip characteristics are provided. Further, various bearing embodiments exhibit improved stabilization between the other components of the assembly. Further, according to embodiments herein, the various bearings may offer simple installation and retrofit existing assemblies. Further, use of a low friction layer on the bearing may significantly reduce friction between the inner and outer components during translation. Bearings of various embodiments may further provide improved sliding force control when used between mating components. The bearings of the various embodiments herein may reduce or eliminate undesirable characteristics, such as vibration, stick-slip, and friction within components of a vehicle suspension.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

An assembly comprising: an inner member; an outer member; and a bearing comprising a bearing sidewall comprising a flat portion, a first convex axial end, and a second convex axial end, wherein at least one of the inner member or the outer member is adapted to axially translate relative to the bearing and wherein at least one of the first convex axial end or the second convex axial end is adapted to induce formation of a film on the bearing sidewall during the axial translation of at least one of the inner member or the outer member.

Embodiment 2

A method comprising: providing an inner member; providing an outer member; providing a bearing disposed between the inner member and the outer member, the bearing comprising a bearing sidewall comprising a flat portion, a first convex axial end, and a second convex axial end; and axially translating at least one of the inner member or the outer member relative to the bearing to induce formation of a film on the bearing sidewall.

Embodiment 3

The assembly or method of any of the preceding embodiments, wherein at least one of the first convex axial end or the second convex axial end is continuously convex.

Embodiment 4

The assembly or method of any of the preceding embodiments, wherein at least one of the first convex axial end or the second convex axial end has a radius of curvature of at least 0.05 mm.

Embodiment 5

The assembly or method of any of the preceding embodiments, wherein the bearing comprises a substrate.

Embodiment 6

The assembly or method of embodiment 5, wherein the substrate comprises a plastic, a metal, or a ceramic.

Embodiment 7

The assembly or method of embodiment 5, wherein the substrate comprises steel or stainless steel.

Embodiment 8

The assembly or method of embodiment 5, wherein the bearing further includes a low friction layer overlying the substrate.

Embodiment 9

The assembly or method of embodiment 8, wherein the low friction layer comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

Embodiment 10

The assembly or method of embodiment 8, wherein the low friction layer comprises a fluoropolymer.

Embodiment 11

The assembly or method of any of embodiments 5-10, wherein the bearing further comprises an adhesive layer between the substrate and the low friction layer.

Embodiment 12

The assembly or method of embodiment 11, wherein the adhesive layer comprises epoxy resins, polyimide resins, polyether/polyamide copolymers, ethylene vinyl acetates, ETFE copolymer, or any combination thereof.

Embodiment 13

The assembly or method of any of the preceding embodiments, wherein the film comprises a lubricant comprising at least one of water, a grease, or an oil.

Embodiment 14

The assembly or method of any of the preceding embodiments, wherein the assembly is a suspension assembly for a vehicle.

Embodiment 15

The assembly or method of any of the preceding embodiments, wherein bearing comprises an axial gap.

Embodiment 16

The assembly or method of any of the preceding embodiments, wherein the formation of the film is induced on the flat portion of the bearing sidewall.

Embodiment 17

The assembly or method of any of the preceding embodiments, wherein at least one of the first convex axial end or the second convex axial end of the bearing is formed by at least one of chamfering, turning, reaming, forging, extruding, molding, sintering, rolling, or casting.

Embodiment 18

The assembly or method of any of the preceding embodiments, wherein at least one of the inner member or the outer member is a rod, shaft, or tube within a bicycle assembly.

Embodiment 19

The assembly or method of any of the preceding embodiments, wherein the length, L, is between about 5 to 100 mm.

Embodiment 20

The assembly or method of any of the preceding embodiments, wherein the bearing has an outer radius, IR, between about 5 to 25 mm.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. An assembly comprising:
   an inner member;
   an outer member; and
   a bearing comprising a bearing sidewall comprising a flat portion, a first convex axial end, and a second convex axial end, wherein at least one of the inner member or the outer member is adapted to axially translate relative to the bearing, and wherein at least one of the first convex axial end or the second convex axial end is adapted to induce formation of a film on the bearing sidewall during the axial translation of at least one of the inner member or the outer member.

2. The assembly of claim 1, wherein at least one of the first convex axial end or the second convex axial end is continuously convex.

3. The assembly of claim 1, wherein at least one of the first convex axial end or the second convex axial end has a radius of curvature of at least 0.05 mm.

4. The assembly of claim 1, wherein the bearing comprises a substrate.

5. The assembly of claim 4, wherein the substrate comprises a plastic, a metal, or a ceramic.

6. The assembly of claim 4, wherein the substrate comprises steel or stainless steel.

7. The assembly of claim 4, wherein the bearing further includes a low friction layer overlying the substrate.

8. The assembly of claim 7, wherein the low friction layer comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

9. The assembly of claim 7, wherein the low friction layer comprises a fluoropolymer.

10. The assembly of claim 4, wherein the bearing further comprises an adhesive layer between the substrate and the low friction layer.

11. The assembly of claim 10, wherein the adhesive layer comprises epoxy resins, polyimide resins, polyether/polyamide copolymers, ethylene vinyl acetates, ETFE copolymer, or any combination thereof.

12. The assembly of claim 1, wherein the film comprises a lubricant comprising at least one of water, a grease, or an oil.

13. The assembly of claim 1, wherein the assembly is a suspension assembly for a vehicle.

14. The assembly of claim 1, wherein bearing comprises an axial gap.

15. The assembly of claim 1, wherein the formation of the film is induced on the flat portion of the bearing sidewall.

16. The assembly of claim 1, wherein at least one of the inner member or the outer member is a rod, shaft, or tube within a bicycle assembly.

17. The assembly of claim 1, wherein the bearing has an overall axial length, L, is between about 5 to 50 mm.

18. The assembly of claim 1, wherein the bearing has an overall outer diameter, OD, between about 5 to 100 mm.

19. A method comprising:
providing an inner member;
providing an outer member;
providing a bearing disposed between the inner member and the outer member, the bearing comprising a bearing sidewall comprising a flat portion, a first convex axial end, and a second convex axial end; and
axially translating at least one of the inner member or the outer member relative to the bearing to induce formation of a film on the bearing sidewall.

20. The method of claim 19, wherein at least one of the first convex axial end or the second convex axial end of the bearing is formed by at least one of chamfering, turning, reaming, forging, extruding, molding, sintering, rolling, or casting.

* * * * *